United States Patent

Rose et al.

[15] 3,653,928

[45] Apr. 4, 1972

[54] EASILY PEELED SYNTHETIC CASING

[72] Inventors: Henry J. Rose; Albin F. Turbak; Thomas E. Leahy, all of Danville, Ill.

[73] Assignee: Tee-Pak, Inc., Chicago, Ill.

[22] Filed: June 30, 1969

[21] Appl. No.: 837,873

[52] U.S. Cl..............................................99/176, 117/144
[51] Int. Cl........................................................A22c 13/00
[58] Field of Search..............99/176, 174 P, 175 P; 117/144

[56] References Cited

UNITED STATES PATENTS

| 2,167,105 | 7/1939 | Drew | 117/144 |
| 2,226,554 | 12/1940 | Drew | 117/144 |
| 2,637,321 | 5/1953 | Cresswell | 99/176 |
| 2,709,138 | 5/1955 | Weingand | 99/176 |
| 3,361,577 | 1/1968 | Simon | 99/176 |
| 3,451,827 | 6/1969 | Bridgeford | 99/176 |
| 3,525,628 | 8/1970 | Cohly | 99/176 |

*Primary Examiner*—Frank W. Lutter
*Assistant Examiner*—Robert Halper
*Attorney*—Neal J. Mosely and David V. Munnis

[57] ABSTRACT

Sausages, such as frankfurters and bolognas, formed in synthetic casings are more easily peeled by soaking the casings; either at the time of manufacture or after stuffing with sausage emulsion, with a soluble non-toxic food grade salt, complex, or coordination compound of iron, aluminum, calcium or magnesium which will interact with components of the sausage emulsion to modify the surface characteristics of the sausage. The soluble metal compounds are preferably applied to frankfurter sausage casings at the time of manufacture just prior to drying the casing. The soluble metal compounds may also be applied to the soak water for larger casings of the type used for bolognas. The soluble metal compounds may also be applied as an external soak bath to the casing before stuffing or to the stuffed sausages, both the frankfurter and bologna types to saturate the casing and provide a uniform application of the metal compound to interact with sausage emulsion components at the surface contacting the casing. The use of casings soaked or impregnated with these metal compounds facilitates removal of the casing from the smoked and/or cooked sausages at a time when untreated casing could not be peeled from the sausage.

6 Claims, No Drawings

EASILY PEELED SYNTHETIC CASING

BACKGROUND OF THE INVENTION

1. Field of the Invention

In the preparation of sausages of various types, ranging from smaller sausages such as frankfurters and viennas up to large sausages such as bolognas, the sausage meat is normally extruded into a tubular casing for processing. In the early days of the packing industry, sausages were prepared using natural casings. About forty years ago, casings were developed of regenerated cellulose which have been used in the preparation of sausages of all sizes. clear, thin-walled, cellulosic casings were used primarily in the preparation of frankfurters and viennas. Larger diameter, heavy-walled, cellulosic casings, both clear and fibrous-reinforced, were used in the manufacture of larger sausages of the bologna type. In the manufacture of both large and small sausages, a major problem has been the stripping of the sausage casing from the sausage after it has been smoked and cooked by the meat packer. This problem has been especially great in the case of frankfurter sausages because of the large number of sausages processed.

In the preparation of frankfurters and other small sausages, a sausage paste or emulsion is extruded from a stuffing horn into a shirred sausage casing. The shirred casing will normally contain from 80 to 160 feet of casing in a shirred length of 10 to 20 inches. The sausage paste or emulsion is extruded into the casing at a high speed with the result that the entire length of the casing is filled with sausage emulsion in a few seconds. As the casing is filled with sausage emulsion it passes into a linking device which twists the casing to form individual sausage links. The encased lengths of sausage are then cooked and smoked and are stored in a refrigerated room for about 24 hours prior to peeling. After extended storage in the chill room the encased sausages are removed into a peeling room which is maintained at a relatively high humidity. The chilled sausage has a considerable amount of moisture condensed on its surface removing from the chill room which facilitates removal of the casing from the individual sausages. The sausages are passed through a commercial peeling machine which cuts open the casing without cutting the encased meat and removes the casing from the sausage. Sausages which are not separated from the casing by the automatic peeling machinery must be separated by hand which adds NaOH: to the cost of processing. Normally, if a particular string of sausage is difficult of peel it is returned to the chill room and cooled for an additional period of time to allow the meat emulsion to set up more thoroughly and facilitate casing removal. In the processing of frankfurters and other small sausages a major item of cost is the removal of casing from the finished sausages, particularly the cost of a high inventory in the chill room and the cost of hand peeling sausages which do not peel cleanly on the automatic peeling machinery.

2. Description of the Prior Art

The prior art has been concerned with the problem of improving the peelability of synthetic casings from sausages for many years. The attempted solutions to the problem suggested by the prior art have mainly involved the application of various coatings to the inner surface of the synthetic casings to permit the casings to be peeled more readily from the sausages. Weingand U.S. Pat No. 2,709,138 discloses an internal release coating of a fatty isocyanate. Firth U.S. Pat. No. 3,106,471 discloses release coatings of fatty ketenes. Underwood U.S. Pat. No. 2,901,358 discloses release coatings of stearato chromic chloride chemically combined on the inner surface of the casing. Chiu U.S. Pat. No. 3,307,956 discloses release coatings of water soluble silicones. Turbak U.S. Pat. No. 3,442,663 discloses release coatings of water insoluble polymerized silicones applied internally as a polymerized methyl hydrogen siloxane. Bridgeford U.S. Pat. No. 3,451,827 discloses release coatings of lactic acid, calcium lactate, trisodium hexametaphosphate, aluminum sulfate, potassium aluminum sulfate, lecithin diammonium phosphate, carboxymethyl cellulose, silicone oil, calcium phytate, inositol, glycerophosphoric acid, acetylated monoglycerides, methyl cellulose, or cetyl alcohol applied internally to the casing during the mechanical shirring of the casing. ½

The prior art, as exemplified by the aforementioned patents, has had only limited success in providing easily peelable synthetic casings for frankfurters and other small size sausages. The various coatings disclosed in the prior art are applied to the interior of large size casings, such as those used for bolognas, etc., by an internal slug coating technique. This coating technique however is not applicable to the interior coating of frankfurter type synthetic sausage casings because of the very small diameter of such casings and the speed of manufacture which makes it difficult to introduce a coating liquid inside the casing. Coating materials such as those disclosed in U.S. Pat. No. 3,307,956 may be added from the outside of the casing in aqueous solution. However, the silicone coating materials which are water soluble or soluble in aqueous alkali are not approved coating materials for use with meat or other food products. Coating materials of the type disclosed in U.S. Pat. Nos. 3,442,663 and 3,451,827 may be applied to small diameter casings during mechanical shirring on a shirring machine. The application of coatings during shirring however is somewhat irregular and often results in an interior coating which is incomplete in coverage and quite variable in thickness.

SUMMARY OF THE INVENTION

This invention is based upon the discovery that artificial sausage casings, particularly casings of regenerated cellulose, both of the clear cellulose and fibrous-reinforced types, may be more easily peeled from sausages processed in the casing when thoroughly impregnated or soaked with solutions of salts, chelates, or complexes of iron, aluminum, calcium, or magnesium which interact with components of a sausage paste or emulsion to modify the surface properties of the sausage and permit easy release of the casing. The compounds mentioned above are preferably applied to frankfurter type casings after completion of all of the chemical processing and washing and just prior to drying of the casing. The compounds are added in aqueous solution at a pH greater than 4 so that the casing is not damaged on extended storage. The compounds used in treating the casing are non-toxic edible materials which remain soluble after the casing has been dried and shirred. The materials which are saturated in and impregnated throughout the casing are extractable from the casing into the outer surface layer of the sausage paste or emulsion processed in the casing. Under these conditions the impregnant materials interact with proteinaceous or fatty or other components of the sausage emulsion to modify the surface properties of the sausage and permit easy peeling of the casing from the sausage.

While this method of providing easy release of casing from sausages is primarily useful for frankfurter sausage casings it may be applied in a modified form both for frankfurter casings and larger sausage casings. In applying this invention to provide easy release of larger clear cellulose casings or fibrous casings from bolognas and the like the soluble metal compounds used to impregnate the casing are applied to the casing in the soak water used to soften the casing prior to stuffing with the sausage paste or emulsion or the stuffed sausage may be soaked for a short time in a solution of the metal compounds to provide a sufficient amount of the metal compounds at the surface of the casing to interact with the sausage emulsion or paste components and provide for easy release of the casing. Similarly, solutions of the metal compounds may be applied to encased frankfurters after stuffing and linking to soak the casings with the metal compounds in an amount sufficient to interact with components of the sausage paste or emulsion to provide for easy peeling of the casing therefrom.

DESCRIPTION OF THE PREFERRED EMBODIMENTS

In the manufacture of regenerated cellulose sausage casings, viscose is extruded through an annular die into a coagulating and regenerating bath to produce a tube of regenerated cellulose. The tube is subsequently washed, plasticized with glycerin, and dried while inflated under a substantial air pressure for size control. After drying, the casing is wound on reels and subsequently shirred on high speed shirring machines, such as those described in U.S. Pat. Nos. 2,010,626; 2,583,654; 2,722,714; 2,722,715; 2,723,201; etc. Reinforced cellulose casing, also known as fibrous casing, is prepared by forming a tube of a long fiber hemp paper, or the like, impregnating the paper tube with viscose, and regenerating cellulose in and on the paper tube. The viscose-impregnated tube is passed into a coagulating and regenerating bath and then subsequently washed, plasticized with glycerin and dried under air pressure. Fibrous casing is used largely for the production of large sausages such as bolognas. Large diameter clear unreinforced regenerated cellulose casing is also used in the production of large bologna type sausages. Fibrous casing and the large clear cellulosic casings are normally sold as flat stock either in the form of reel stock or cut into pieces of predetermined length.

We have found that cellulosic casings, and other synthetic sausage casings are more easily peeled from sausages processed therein if thoroughly soaked with edible non-toxic salts, chelates, or coordination complexes of iron, aluminum, calcium, or magnesium. In the case of small diameter clear cellulosic casings of the type used in the production of frankfurter sausages, the soluble metal salts, chelates, or coordination complexes, are applied to the casing either in the glycerin bath or in a separate bath following the glycerin bath just prior to drying. The soluble metal compounds can also be applied to soak baths for larger diameter clear and fibrous casings or can be applied to soak baths for sausages encased in the casings, whether of the large or small size.

In carrying out this invention any soluble non-toxic edible salts, chelates, or coordination complexes of iron, aluminum, calcium or magnesium may be used which will interact with components of the sausage emulsions to modify the surface characteristics of the sausage at the interface between the sausage and the casing. Typical compounds which may be used include sulfates, citrates, malates, tartrates, gluconates, ascorbates, erythorabates, chlorides, nitrates, etc. of iron, aluminum, calcium or magnesium, either in the form of the water soluble salts buffered to a pH at which the metal iron remains in solution or in the form of mixed salts such as ferric ammonium sulfate or ferric ammonium citrate, or chelated or complexed with $\alpha$-hydroxy aliphatic carboxylic acids or $\alpha$-amino aliphatic carboxylic acids or polyfunctional acids such as EDTA. When solutions of these compounds are applied to frankfurter type casings the solutions must be buffered to a pH greater than about 4 to prevent acidic degradation of the casing. When solutions of these compounds are used in treating casings immediately prior to stuffing with sausages or for treating encased sausages it may be possible to use more acidic solutions. In either case, the metal compounds are present in a concentration sufficient to provide more than 50 p.p.m. of soluble metal in the casing.

In testing the efficacy of this invention casings treated as described above were stuffed with sausage emulsion or paste and formed into sausage links. The stuffed casings were cooked and smoked and chilled for extended periods in accordance with standard commercial practice prior to peeling. The ease of peeling of the treated casings from the sausages encased therein was compared with the ease of peeling of untreated control casings. As will be noted in the following examples, the treated casings invariably are peeled more easily using standard commercial peeling equipment than are the untreated controls.

The following non-limiting examples are illustrative of the scope of this invention:

EXAMPLE 1

A solution was prepared by dissolving 2300 g. ferric ammonium citrate and 2710 g. aluminum sulfate in 5 gal. distilled water. To this solution there was added 2600 g. of 23 percent aqueous sodium hydroxide to adjust the pH to a value greater than 4. To this solution there was added 1000 g. trisodium citrate to complex the partially basic ferric ammonium citrate and thus stabilize the solution. The solution was then diluted with water and glycerin to a volume of 50 gal. The amount of glycerin added was 18.5 percent of the final diluted bath. The treating bath which was thus prepared comprises 1.3 percent wt. ferric ammonium citrate, 1.5 percent wt. aluminum sulfate, 0.55 percent trisodium citrate, 0.33 percent sodium hydroxide. and 18.5 percent glycerin. The bath had a final pH of 4.9.

This treating solution was substituted for the glycerin bath cellulosic to plasticize regenerated cellulose casing in a commercial casing manufacturing machine. The casing passed through the bath at a linear speed of at least 75 feet per minute and had a residence time in the bath of about 20 seconds. The residence time of the casing in the bath is interdependent on the concentration of the bath. Thus, if a more dilute bath were used a longer residence time would be required and likewise a much shorter residence time can be used if the bath is used in a concentrated form. The casing passes from the treating bath through a dryer where the casing is dried under inflation with air pressure to prevent shrinkage. The casing leaving the dryer is wound on reels and subsequently shirred on a commercial shirring machine into shirred lengths of a size suitable for the meat packer which is to use the casing.

Some of the treated casings, together with untreated control casings, were stuffed with a commercial frankfurter paste or emulsion and processed under usual commercial processing conditions. Frankfurters are normally stuffed into shirred casings and the casing filled out from a shirred length of 10–20 inches out to an extended length of 80–160 feet in a matter of a few seconds. As the casing is being stuffed it passes through a commercial linking machine to form a string of frankfurter links. The string of links is cooked and smoked and then placed in a chill room for a period of 24–48 hours or longer if needed. The thoroughly chilled sausages are then brought into a highly humid room where moisture condenses on the casing to facilitate casing removal. The chilled and sweated frankfurter links are then passed through a commercial peeling machine which removes the casing from the individual links.

As an extreme test of the efficacy of this invention, some of the controls and treated casings, stuffed with frankfurter emulsion, were removed from the chill room after about 2 ½ hours to evaluate the peeling of casing under these conditions. The control casing could not be peeled from the frankfurters using commercial peeling equipment and, in fact, attempts to peel the casing manually resulted in tearing meat from the surface of the frankfurters. The treated casing peeled very well from the frankfurters using standard commercial peeling machinery with less than 10 percent misses. Furthermore, the sausages missed on the peeling machine were easily peeled by hand without pulling meat from the surface of the frankfurters. The frankfurters processed in control casing were cooled for an additional 2 hours in the chill room and further tested for removal of casing. Attempts at this point to peel casing using a commercial peeling machine resulted in 50–75 percent misses for control casing.

When frankfurters formed in control casings and the treated casings were refrigerated for the full 24 – 48 hour period there was a substantial improvement in the performance of the untreated control. Nevertheless, the treated casings peeled with substantially fewer misses even under these conditions. From these experiments it is seen that the use of the treated casing improves substantially the peeling performance under normal processing conditions and further permits the peeling of casing from the frankfurters after a much shorter chill period. The use of the treated casings in preparation of frankfurters permits the meat packer to maintain a lesser inventory in the chill room and /or a substantial increase in throughput as a result of the improved peelability of casing after a short chill period.

EXAMPLE 2

A treating solution was prepared by dissolving 1800 g. ferric sulfate in about 5 gal. distilled water together with 1800 g. trisodium citrate and 3050 g. citric acid to form a soluble chelate. There was then added to the solution 3800 g. of 28 percent aqueous ammonia to bring the pH of the solution to 7.2. The solution was further diluted with water and glycerin to 50 gal. The glycerin constituted 15 percent wt. of the final solution.

This treating solution was used in the treatment of commercial cellulose frankfurter casings as a substitute for the usual glycerin plasticizing bath. The casing is passed through the treating bath just prior to entering the dryer. After drying, the casing is reeled and subsequently shirred as is done with untreated control casing.

Shirred casing produced in accordance with this example was used together with untreated control casing in the preparation of commercial frankfurters. The processing conditions were essentially those described in Example 1. After 2 ½ hours chilling the treated casings could be readily removed from the frankfurters using commercial fast peeling machinery while the untreated controls could not be removed. After a full 24 – 48 hours chill period the treated casings generally exhibited substantial improvement in peeling as compared to the untreated controls.

EXAMPLE 3

A solution was prepared by dissolving 1800 g. ferric sulfate in about 5 gal. distilled water together with 2500 g. malic acid to form a soluble complex or chelate. The solution was neutralized to pH 6.9 by addition of 2200 g. of 28 percent aqueous ammonia and 1900 g. of 23 percent aqueous NaOH. This solution was then diluted to 50 gal. with water and glycerin. The glycerin content of the diluted solution was 18.5 percent.

The diluted solution was used in place of the glycerin plasticizing bath in a commercial casing manufacturing apparatus. The casing passed through the bath at a speed of at least 75 feet per minute with a residence time of about 20 seconds in the bath, just prior to entering the dryer. The casing was dried under inflation with air pressure, reeled, and shirred.

Treated casings, together with untreated control casings, were used in the preparation of commercial frankfurters substantially as described in Example 1. At the end of a 2 ½ hour chill period the treated casings peeled readily from the frankfurter links while untreated control casings could not be peeled on commercial peeling machines. At the end of a full 24 – 48 hour chill period the treated casing still peeled substantially better, i.e., with fewer misses then untreated control casing using commercial peeling machines.

EXAMPLE 4

A treating solution was prepared by dissolving 2300 g. ferric sulfate in about 5 gal. distilled water together with 2400 g. acid to form a soluble complex or chelate. The solution was neutralized to pH 6.5 by addition of 2300 g. of 28 percent aqueous ammonia and 2500 g. of 23 percent aqueous NaOH. The solution was diluted to 50 gal. by addition of water and glycerin. The glycerin constituted 18.5 percent wt. of the diluted solution.

The treating solution was used in the preparation of clear cellulosic frankfurter casings substantially as described in the previous examples. The treated casings, together with untreated controls, were evaluated in the preparation of commercial frankfurters. The treated casings peeled substantially better, e.g., less than 10 percent misses, than the untreated casing, greater than 25 percent misses, after a 2 ½ hour chill period. After the full 24 – 48 hour chill period the treated casing still exhibited substantially better peelability, i.e., fewer peeling misses, when the frankfurters were peeled on commercial peeling machines.

EXAMPLE 5

A treating solution was prepared comprising 1.0 percent ferric sulfate, 1.5 percent malic acid, 0.5 percent ammonia, and 15 percent glycerin in 50 gal. distilled water. The malic acid forms a soluble complex or chelate to prevent precipitation and the ammonia neutralizes the solution to bring it to pH 7.0.

This treating solution was used in the preparation of commercial frankfurter casings as described in the previous examples. The treated casings were more easily removed from frankfurters than were the untreated control casings both after a short chill period and after a full 24 – 48 hour chill period. After the short chill period, the casing exhibited less than 10 percent misses, and in some cases less than 3 percent, using commercial casing peeling machinery. After the short chill period it was virtually impossible to remove the untreated control casings using standard commercial peeling machinery.

EXAMPLE 6

A treating solution was prepared by dissolving 1300 g. of ferric sulfate and 2300 g. of aluminum sulfate in about 5 gal. distilled water together with 660 g. of trisodium citrate and 1000 g. of malic acid to form stable coordination complexes. The solution was neutralized to pH 5.7 by addition of 1800 g. of 28 percent aqueous ammonia and 1500 g. of 23 percent aqueous NaOH. The treating solution was then diluted to 50 gal. by addition of distilled water and sufficient glycerin to provide a 15 percent concentration in the finished solution.

The treating solution thus prepared was used in saturating and impregnating regenerated cellulose frankfurter casings by substitution of the solution for the usual glycerin plasticizing bath. The casing was dried, reeled, and shirred.

Treated casings, together with untreated controls, were stuffed with frankfurter emulsion, linked, smoked, and cooked. The frankfurters were stored in a chill room and tested for peeling at various intervals. After a 2 ½ hour chill period the treated casing would peel on commercial peeling machinery with peeling misses of the order of 15 percent or less. Control casing either would not peel or would have peeling misses of 50 percent or more under the same conditions. When the frankfurters were chilled for a full 24 – 48 hour period the number of peeling misses were substantially less for both treated and control casings. The treated casing however exhibited substantially lower peeling misses, thus being vastly superior to the untreated controls.

EXAMPLE 7

A casing treating solution was prepared by dissolving 1800 g. ferric sulfate and 1200 g. aluminum sulfate in about 5 gal. of distilled water together with 1800 g. trisodium citrate and 100 g. citric acid to form stable soluble complexes or chelates. The solution was neutralized to pH 7 by addition of 1000 g. of 28 percent aqueous ammonia. The treating solution was diluted to 50 gal. by addition of distilled water and sufficient glycerin to provide a concentration of 15 percent wt.

This treating solution was used to saturate and impregnate frankfurter casings following the procedure described in the previous examples. When the treated casings were compared with untreated controls they were found to peel from finished frankfurters substantially better than the controls at all stages in the processing.

EXAMPLE 8

A casing treating solution was prepared by dissolving 4800 g. ferric sulfate in about 5 gal. distilled water together with 3200 g. trisodium citrate and 3300 g. malic acid to form soluble complexes or chelates. The solution was then neutralized to pH 7 by addition of 4950 g. of 28 percent aqueous ammonia. The solution was diluted to 50 gal. by addition of distilled water and sufficient glycerin to provide a concentration of 15 percent.

This treating solution was used in the impregnation of frankfurter casings as described in Example 1. When the treated casings were stuffed with frankfurter emulsion and compared with untreated controls they were found to peel substantially better at all stages of the processing. After 24 hours in the chill room, the frankfurters stuffed in treated casings were found to peel with misses of less than 10 percent while the frankfurters stuffed in untreated controls had peeling misses in excess of 20 percent.

EXAMPLE 9

A casing treating solution was prepared by dissolving 2400 g. ferric sulfate and 1600 g. ferric ammonium citrate in about 5 gal. of distilled water together with 1100 g. of malic acid to form a stable soluble complex or chelate. The solution was then neutralized to pH 7 by addition of 2500 g. of 28 percent aqueous ammonia. The treating solution was diluted to 50 gal. by addition of distilled water and sufficient glycerin to provide a concentration of about 15 percent.

The treating solution was used in the preparation of frankfurters and compared with untreated controls as described in Example 1. The frankfurters prepared in the treated casings were found to peel much better than the ones prepared in control casings. After about 24 hours in the chill room, the treated casings were found to peel with less than 10 percent misses while the untreated controls had more than 20 percent misses.

EXAMPLE 10

A casing treating solution was prepared by dissolving 2200 g. calcium chloride dihydrate in about 5 gal. of distilled water. The solution was buffered to pH 7 by addition of lime or of hydrochloric acid, as required. The buffered solution was then diluted to 50 gal. by addition of distilled water and sufficient glycerin to provide a 15 percent concentration.

This calcium chloride treating solution is applied to clear cellulosic frankfurter casings in the same manner described in Example 1. The treating bath is used in a standard commercial casing manufacturing process in substitution for the glycerin plasticizing bath.

When treated casings are stuffed with frankfurter emulsions and compared with untreated controls the casings are found to peel more readily from the frankfurters than do the control casings. The treated casings peel considerably better from the frankfurters after a short chilling period and are substantially better after a 24 - 48 hour chill period, although the difference is not so pronounced at this stage in the processing.

EXAMPLE 11

A casing treating solution was prepared by dissolving 600 g. ferric sulfate and 800 g. calcium chloride dihydrate in about 5 gal. of distilled water together with 800 g. of malic acid to complex the ferric sulfate. The solution was then neutralized to a pH 6.7 by addition of 800 g. of 28 percent aqueous ammonia.

This treating solution was used to treat clear cellulosic frankfurter casings as described in Example 1.

When this casing is used in the preparation of commercial frankfurters and compared with untreated controls it is found to give superior peeling performance. The treated casing peels better than control from the finished frankfurters both after short and extended chill periods.

EXAMPLE 12

A casing treating solution was prepared by dissolving 1590 g. of magnesium chloride hexahydrate in about 5 gal. water and buffering the solution to pH 7. The solution was then diluted to 50 gal. by addition of water and sufficient glycerin to provide 15 percent wt. in the finished solution.

The treating solution was used in saturating and impregnating cellulosic frankfurter casings as described in Example 1. The treating solution is used in lieu of the glycerin plasticizing bath in a standard commercial casing manufacturing process.

When casing produced in accordance with this example is used in the preparation of frankfurters it is found to peel from the frankfurters more readily than control casing at all stages in the processing of the frankfurters.

EXAMPLE 13

A casing treating solution is prepared by dissolving calcium nitrate in about 5 gal. distilled water and diluting to 50 gal. with addition of water and sufficient glycerin to provide a concentration of about 15 percent wt.

This treating solution is used to saturate and impregnate casing in lieu of the glycerin plasticizing bath as described in the previous examples. When the casing is used in the preparation of frankfurters it is found to peel more readily than untreated controls at all stages in the processing.

EXAMPLE 14

A casing treating solution is prepared by dissolving aluminum sulfate in distilled water and complexing with trisodium citrate. Sufficient aqueous NaOH is then added to render the solution about two-thirds basic. The solution is then diluted to 50 gal. with addition of sufficient glycerin to provide a concentration of about 15 percent wt. The treating solution has an aluminum sulfate content of about 2.5 percent and a pH of about 6.

When this treating solution is substituted for the glycerin plasticizing bath in a casing manufacturing process, as described in the previous examples, a casing is obtained having superior peeling properties. When the treated casing is used in the preparation of frankfurters it peels more readily than untreated control casings at all stages in the processing of the frankfurters.

EXAMPLE 15

A casing treating solution is prepared by dissolving magnesium nitrate in about 5 gal. distilled water. The solution is diluted to 50 gal. with addition of distilled water and sufficient glycerin to provide a concentration of 15 percent wt. the casing treating solution contains about 2 percent magnesium nitrate and has a pH of about 7.

When this treating solution is substituted for the glycerin plasticizing bath as described in the previous examples a casing is produced having superior peeling properties. When the casing is used in the preparation of frankfurters it is found to peel more readily than untreated control casings at all stages in the processing of the frankfurters.

From the foregoing examples we have found that the impregnation and saturation of synthetic sausage casings with salts, chelates, or coordination complexes of iron, aluminum, magnesium or calcium is generally effective to provide improved peeling of the casing from frankfurters and similar sausages. While the process has been described as applied to cellulosic casings it should be understood that the compounds mentioned may be applied to any synthetic sausage casings, such as casings of collagen, algiantes, starch, dextran, polyvinyl alcohol, etc., where improved peelability of the casing is desired. Where compounds of iron or aluminum are used, it is generally preferred to form coordination complexes which are neutralized to a sufficient degree to provide a pH in excess of about 4 in the treating solution. A pH in excess of 4 is generally required to prevent acidic degradation of the casing. The compounds used in treating the casings are ones which interact with the sausage emulsion or with the specific components thereof. Without limiting ourselves to any particular theory of operation of the invention, we believe that the compounds used in the treating solution may function to tan, harden or denature proteinaceous components of the sausage emulsion or may interact with fatty components to provide soap-like derivatives which improve the peelability or release characteristics of the casing at the point of contact with the sausages encased therein. The compounds which are used in the treating solutions must be soluble in water or in the sausage emulsion under conditions of use so that they are mobile and readily leached or absorbed from the casing into or onto the surface of the sausage to interact with the surface layer or "skin" of the sausage on contact therewith to provide the improved release properties. The compounds in the treating solution are uniformly impregnated or saturated throughout the casing and are easily applied from outside the casing and this makes possible the preparation of an easy peeling casing without the necessity of coating the casing internally. Casings produced in accordance with this invention not only provide improved peelability but also permit the peeling of sausages at an earlier point in the processing, thus increasing the overall rate of processing of sausages through the meat packing plant.

We claim:

1. A process for treating an artificial sausage casing to improve the peelability of the casing from a sausage processed therein comprising impregnating said casing with a solution of a non-toxic edible sulfate, citrate, malate, tartrate, gluconate, ascorbate, erythorbate, chloride or nitrate of calcium or magnesium; or a salt of iron or aluminum chelated or complexed with an α-hydroxy aliphatic carboxylic acid, or an α-amino aliphatic carboxylic acid, or a salt thereof or ethylene diamine tetraacetic acid or a salt thereof, and buffered to a pH greater than 4, and drying the casing, said salt, chelate, or complex being soluble under conditions of sausage paste or emulsion processing and capable of interacting with one or more components of the sausage paste or emulsion to modify the surface of the sausage in contact with the casing.

2. A process as defined in claim 1 in which the salt, chelate, or complex is in a concentration sufficient to provide a concentration of metal in the casing at least 50 ppm.

3. A process as defined in claim 1 in which the iron or aluminum salt is complexed with citric or malic acid or a salt thereof and neutralized with aqueous ammonia or caustic to a pH greater than 4.

4. A process as defined in claim 1 in which said solution contains sufficient glycerin to plasticize the casing.

5. An artificial sausage casing impregnated with a nontoxic soluble edible salt of iron or aluminum chelated or complexed with an α-hydroxy aliphatic carboxylic acid, or an α-amino aliphatic carboxylic acid, or a salt thereof or ethylene diamine tetraacetic acid or a salt thereof, applied in a solution buffered to a pH greater than 4, said chelate, or complex being capable of interacting with one or more components of the sausage paste or emulsion to modify the surface of the sausage in contact with the casing.

6. An artificial sausage casing as defined in claim 5 containing more than 50 p.p.m. of metal in the form of said chelate, or complex.

* * * * *